April 7, 1931.     D. O. FARRINGTON     1,800,060
VEHICLE DOOR BUMPER
Filed May 24, 1929     2 Sheets-Sheet 1
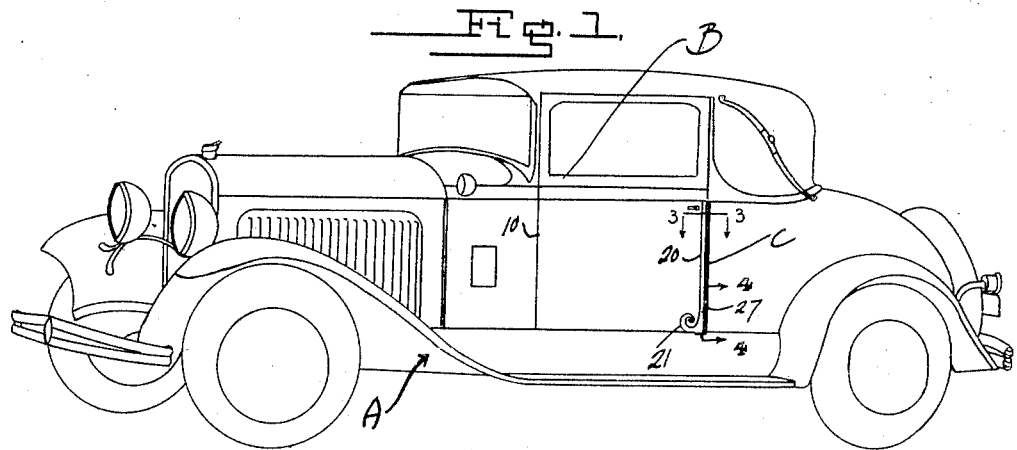
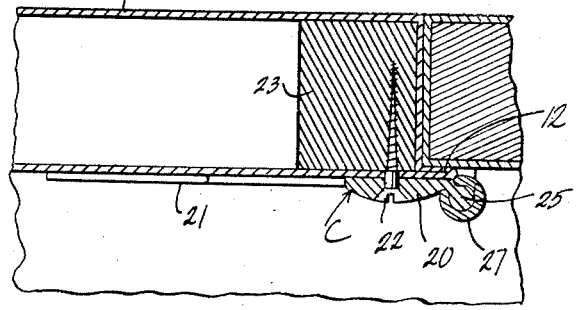
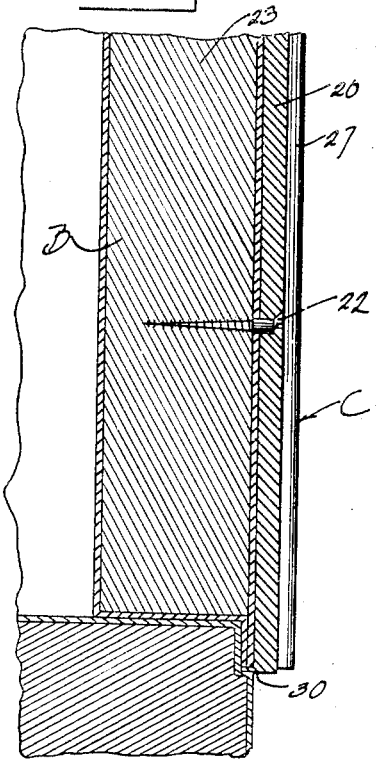
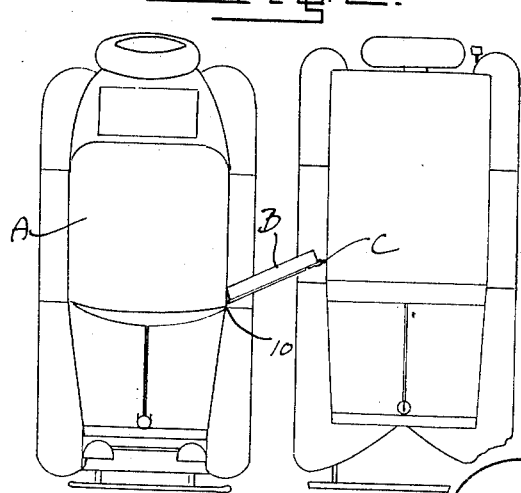
INVENTOR.
Duane O. Farrington
BY
ATTORNEYS.

April 7, 1931.  D. O. FARRINGTON  1,800,060
VEHICLE DOOR BUMPER
Filed May 24, 1929    2 Sheets-Sheet 2
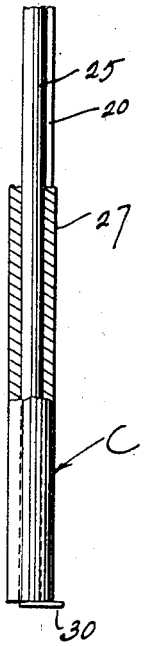
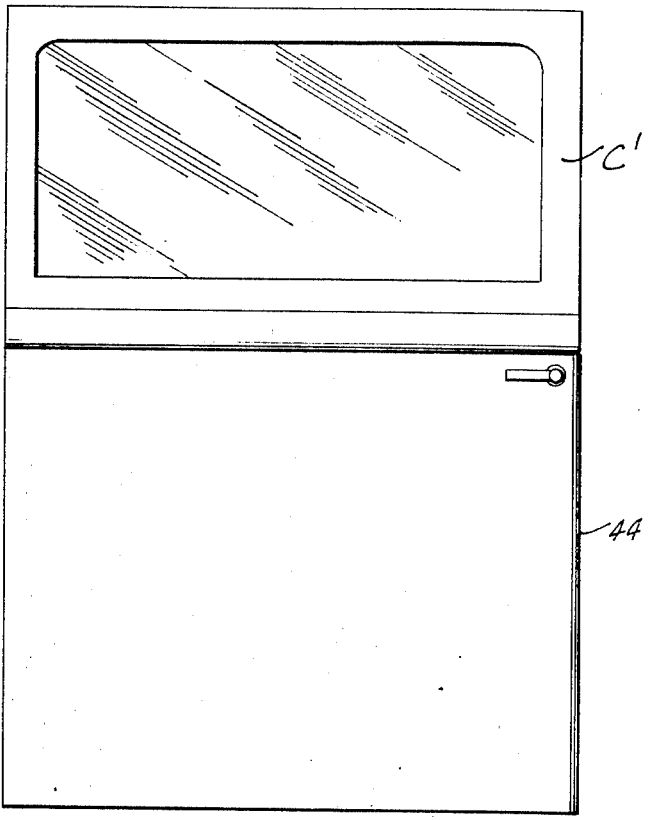
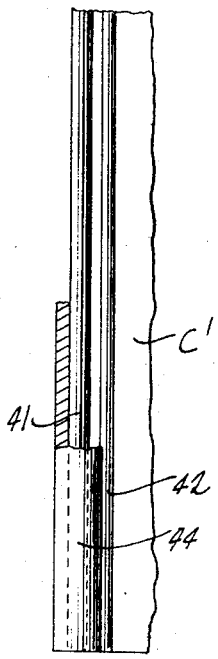
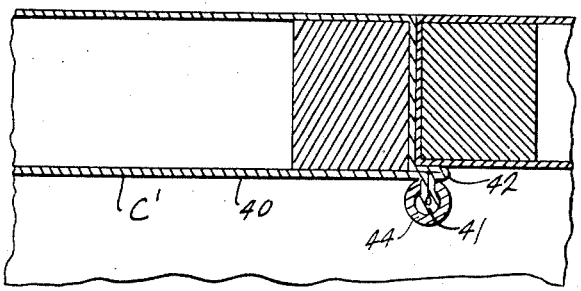
INVENTOR.
Duane O. Farrington
ATTORNEYS.

Patented Apr. 7, 1931

1,800,060

UNITED STATES PATENT OFFICE

DUANE O. FARRINGTON, OF RIVERSIDE, CALIFORNIA

VEHICLE DOOR BUMPER

Application filed May 24, 1929. Serial No. 365,726.

This invention relates to improvements in bumper constructions, particularly well adapted for use upon the doors, for the protection of the same.

It is well known that the swinging edges of vehicle doors are very often marred by reason of contact with fenders, and other bodies, such as adjacent cars, when parked in garages and the like. It is the primary object of this invention to provide an improved bumper constructon along the marginal swinging edge of the door, for the protection of the same; the improved bumper construction being compactly arranged in an ornamental relation upon the door, either serving as an attachment for the door or being built in with the door.

Other objects and advantages of this invention will be apparent during the course of the following detailed description.

In the drawings, wherein for the purpose of illustration are shown preferred and modified forms of the invention.

Figure 1 is a perspective view of a vehicle showing the improved bumper attachment upon a vehicle door.

Figure 2 is a plan view showing the manner in which the improved bumper construction will protect the edge of the door and also the surfaces of adjacent bodies, such as a car, with which it might come into contact.

Figures 3 and 4 are enlarged sectional views taken substantially on their respective lines in Figure 1 of the drawings.

Figure 5 is a fragmentary edge view of the lower portion of the improved bumper attachment.

Figure 6 is a view showing the bumper attachment as "built-in" with the door construction.

Figure 7 is a transverse sectional view showing the relation in which the bumper construction is cooperatively built in with the door, in contradistinction to serving as an attachment for existing cars.

Figure 8 is a fragmentary view, partly in section, showing details of the "built-in" type of bumper for doors.

In the drawings, wherein similar reference characters designate corresponding parts throughout the several views, the letter A may generally designate a car of any approved construction, which is preferably an ordinary automotive vehicle, having a door B connected therewith and swingable along an edge 10 for opening or closing. The door B is of the usual construction, having the marginal flanges 12 about the upper and lower and swinging margins thereof, and the door otherwise may be conventional, being usually of the double-wall type, suitably upholstered internally, or otherwise finished.

The improved bumper construction C shown in Figures 1 to 5 inclusive is of the type adapted to be attached to existing types of vehicle cars. It includes a supporting and finishing strip or body 20, which is segmental in cross section, providing an inner flat surface and an outer convex surface. The body 20 at the lower end thereof may have some ornamental corner portion 21, such as shown in Figure 1. The said body is attached as by counter-sunk screws 22 in the marginal frame portion 23 of the door, to hold the said body 20 in place along the edge of the door, at the outer surface thereof, and overlapping the flange 12 of the door. This body 20 may be finished in nickel or appropriately finished according to desire. It may be made of nickel, or of other metal nickel-plate or otherwise finished. Along the marginal edge thereof immediately at or extending beyond the door lap flange 12, the body 20 is preferably provided with an integral bead or head 25, which in cross section is such as to provide an enlarged head portion connected by a reduced neck with the edge of the body 20. This bead 25 extends throughout the length of the body of the strip C, and is adapted to receive thereon a detachable longitudinally split rubber tube 27, which is the bumper element. This tube 27 is of any desired thickness, and is longitudinally split to permit the same to be readily slipped upon the bead 25; the tube 27 being of inherent resilient tendency so as to frictionally support itself upon the strip 25. Thus, there is provided a bumper portion projecting outwardly and beyond the free edge of the door at the swinging edge of the latter, for protection purposes.

The strip body 20 at the bottom thereof is preferably provided with a laterally inwardly flanged portion 30, shown in Figure 4 and also in Figure 5, adapted to lie beneath the lower edge of the lap flange at the lower edge of the door, and which flange 30 extends into position so as to prevent the frictional bumper tube 27 from slipping downwardly from its retaining bead 25. If desired, the bumper tube 27 may be cemented in place, upon the bead 25.

The bumper is provided longitudinally at the free swinging edge of the door, but it may be elsewhere provided on the edging of the door, for protection purposes, if so desired. It is thought sufficient to provide the same along the door from the bottom edge thereof up to the point adjacent the lower edge of the window in the door, in event such is provided.

It is within the contemplation of the invention to manufacture doors with the bumper strip built therein. This is included in the form of invention illustrated in Figures 6, 7 and 8, and therein it is shown that the metal plate material forming the door, and especially the outer wall 40 of the said door C', is provided with a bead 41 extending longitudinally thereof in normal relation to the plane of the door wall 40, along the outer surface of the lap flange 42, at the front swinging edge of the door. This bead 41 is enlarged along the free marginal portion thereof, and is connected by a reduced portion to the wall 40, preferably integral therewith, or it may be soldered in the position shown. The material of the wall 40 is preferably bent to shape the same as shown. The bead 41 is provided with a bumper tube 44, of some resilient material, such as rubber, fiber, or composition, and it is split longitudinally to facilitate attachment upon the bead 41. It may be cemented in place, but has an inherent tendency to spring in a frictional seating relation upon the bead 41, which will prevent its accidental detachment.

Various changes in the shape, size, and arrangement of parts may be made to the forms of invention herein shown and described, without departing from the spirit of the invention or the scope of the claims.

I claim:

1. In combination with an automobile including a door, and a yieldable bumper strip supported in a protecting relation at and extending at least throughout the major portion of the free outer upright swinging margin of the door.

2. As an article of manufacture a bumper strip for vehicle doors and the like comprising an elongated attaching strip having a bead connected therewith by a reduced neck portion, and a longitudinally split resilient tube attached upon said bead.

3. As an article of manufacture a bumper strip for vehicle doors and the like comprising an elongated attaching strip having a bead connected therewith by a reduced neck portion, a longitudinally split resilient tube attached upon said bead, the strip having a laterally extending flange at the lower end thereof.

4. As an article of manufacture a finishing and bumper supporting strip comprising an elongated body of substantially segmental cross section having a retaining bead connected along a marginal portion thereof by a reduced neck.

5. As an article of manufacture a finishing and bumper supporting strip comprising an elongated body of substantially segmental cross section having a retaining bead connected along a marginal portion thereof by a reduced neck, the bead at the lower end having a laterally projecting portion.

6. As an article of manufacture a vehicle door having a retaining bead connected therewith along at least the major portion of the outer upright free swinging edge thereof, and resilient material covering said bead for protecting purposes.

DUANE O. FARRINGTON.